(12) United States Patent
Schuster

(10) Patent No.: US 11,353,123 B2
(45) Date of Patent: Jun. 7, 2022

(54) VALVE CARTRIDGES

(71) Applicant: Cool Valve, LLC, Eden, UT (US)

(72) Inventor: Andy Schuster, Eden, UT (US)

(73) Assignee: Cool Valve, LLC, Eden, UT (US)

( * ) Notice: Subject to any disclaimer, the term of this patent is extended or adjusted under 35 U.S.C. 154(b) by 0 days.

(21) Appl. No.: 17/244,203

(22) Filed: Apr. 29, 2021

(65) Prior Publication Data

US 2021/0246989 A1 Aug. 12, 2021

(51) Int. Cl.
*F16K 5/06* (2006.01)
*F16K 31/528* (2006.01)
*F16K 31/524* (2006.01)

(52) U.S. Cl.
CPC .......... *F16K 5/0605* (2013.01); *F16K 31/528* (2013.01); *F16K 31/52408* (2013.01)

(58) Field of Classification Search
CPC . F16K 31/52408; F16K 31/528; F16K 37/008
USPC ......................................................... 251/297
See application file for complete search history.

(56) References Cited

U.S. PATENT DOCUMENTS

| | | | | |
|---|---|---|---|---|
| 1,354,965 A | * | 10/1920 | Lincoln | ................. F16K 31/528 251/77 |
| 1,987,135 A | * | 1/1935 | Sugden | ................. F16K 31/528 251/221 |
| 2,438,672 A | * | 3/1948 | Wilton | ................ F16K 37/0008 74/527 |
| 2,521,659 A | | 9/1950 | Wendell et al. | |
| 3,184,214 A | * | 5/1965 | King | .................... F16K 31/5284 251/229 |
| 4,301,830 A | | 11/1981 | Keller, III | |
| 5,535,698 A | * | 7/1996 | Trevisan | ............. F16K 37/0008 116/277 |
| 6,273,041 B1 | | 8/2001 | Haas et al. | |
| 9,708,109 B2 | | 7/2017 | Marina et al. | |
| 2013/0313464 A1 | * | 11/2013 | Gao | ...................... F16K 25/005 251/367 |

OTHER PUBLICATIONS

Aventics, ""A" Pilotair Valve Block Type and Panel Mounted Service Information," May 2014, https://www.aventics.com/media/AVENTICS_USA/Service/Documentation_downloads/Service_literature/SM-700.7400_APilotair.pdf.

* cited by examiner

*Primary Examiner* — Michael R Reid
(74) *Attorney, Agent, or Firm* — Miller IP Law LLC

(57) ABSTRACT

A valve cartridge may include an outer cylindrical body and an inner cylindrical body disposed in a channel formed by the outer cylindrical body. The outer cylindrical body may include a wall that defines the channel. The outer cylindrical body may include a ramped slot. The ramped slot may extend angularly from a first angular position on the wall to a second angular position. The ramped slot may extend longitudinally from a first longitudinal position on the wall to a second longitudinal position. The inner cylindrical body may include a handle interface approximate to a first end of the inner cylindrical body. The inner cylindrical body may include a pin extending radially from the inner cylindrical body and into the ramped slot. The inner cylindrical body may include a valve seat at a second end of the inner cylindrical body.

20 Claims, 6 Drawing Sheets

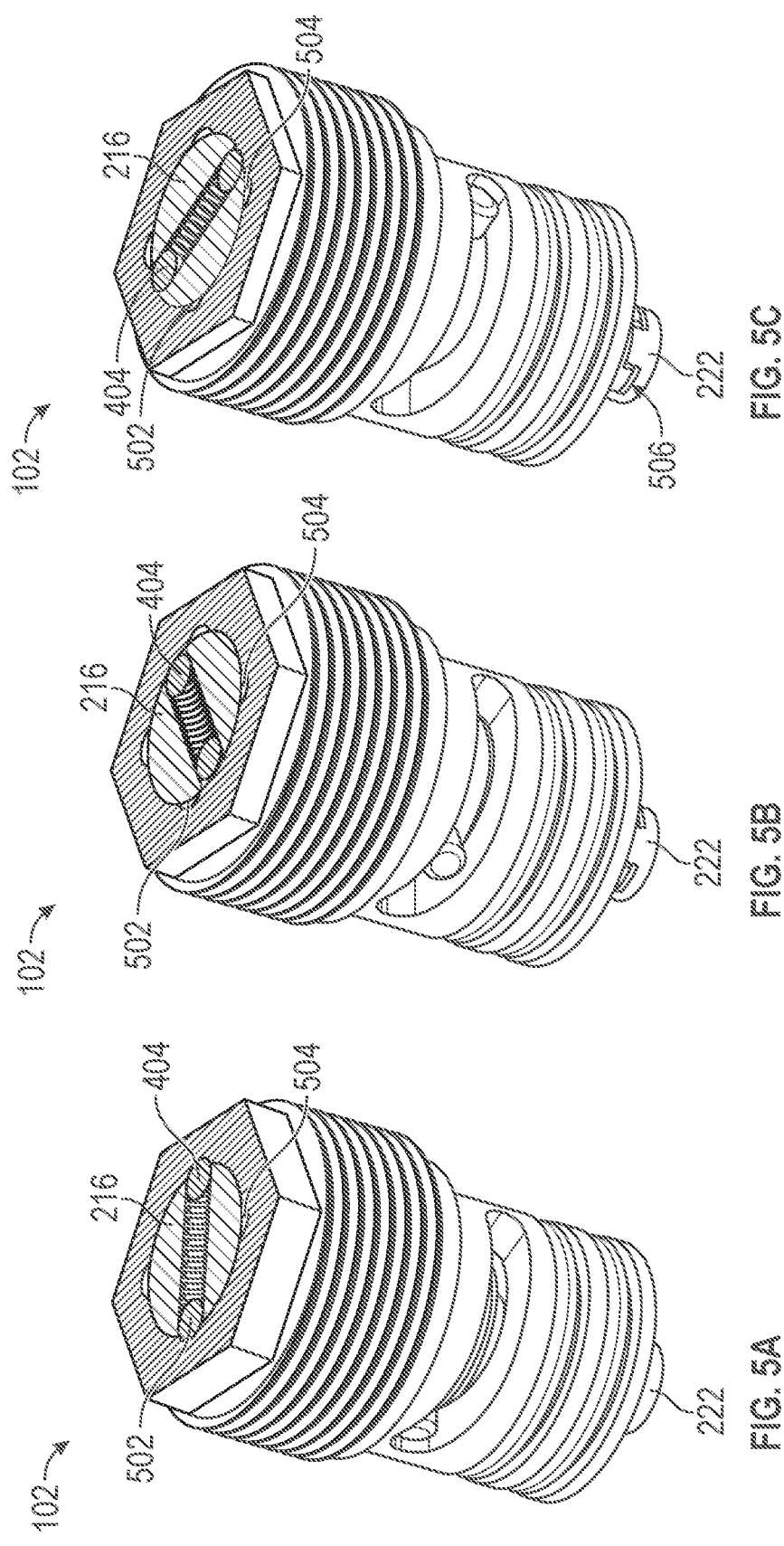

VALVE CARTRIDGES

BACKGROUND

A valve may include a valve body and a flow control mechanism. Valves may be used to control the flow of various substances and in various flow arrangements. A valve may be shaped to enable flow from a supply side of the valve to an outlet side of the valve. The flow control mechanism may be positioned between the supply inlet and the outlet. The supply inlet may be approximately co-axial with an outlet. The supply inlet may form an angle with the outlet. The flow control mechanism may be designed in various ways corresponding to the arrangement of the supply inlet and the outlet. The flow control mechanism may be designed in various ways corresponding to a substance for which the valve regulates flow.

BRIEF DESCRIPTION OF THE DRAWINGS

The present description will be understood more fully when viewed in conjunction with the accompanying drawings of various examples of valve cartridges. The description is not meant to limit the valve cartridges to the specific examples. Rather, the specific examples depicted and described are provided for explanation and understanding of valve cartridges. Throughout the description the drawings may be referred to as drawings, figures, and/or FIGs.

FIG. 5A illustrates a top cross-sectional view of the valve cartridge in a fully open position, according to an embodiment.

FIG. 5B illustrates a top cross-sectional view of the valve cartridge in a partially-closed position, according to an embodiment.

FIG. 5C illustrates a top cross-sectional view of the valve cartridge in a fully-closed position, according to an embodiment.

DETAILED DESCRIPTION

Figure 1:
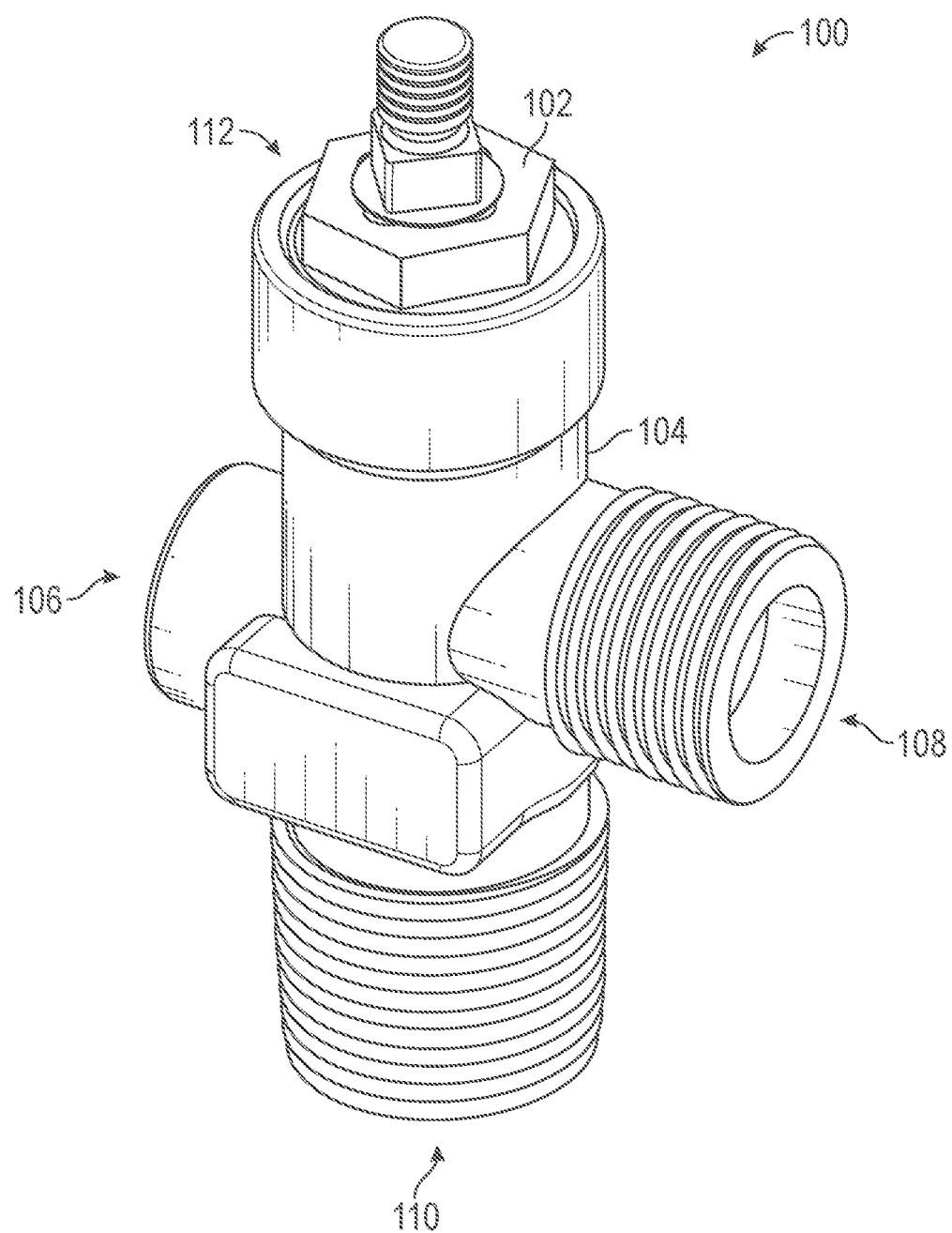
FIG. 1 illustrates a perspective view of a valve including a valve cartridge, according to an embodiment.

Valve cartridges as disclosed herein will become better understood through a review of the following detailed description in conjunction with the figures. The detailed description and figures provide merely examples of the various embodiments of valve cartridges. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional valve may include a flow control mechanism. The flow control mechanism may be designed to accommodate the type of substance that flows through the valve. The substance may, for example, be liquid, gaseous, a combination of liquid and gas, or a gel-like substance. The flow control mechanism may be designed to accommodate the direction of flow through the valve. The valve may include an inlet, a supply, and/or an outlet. A substance flowing from the inlet and/or supply to the outlet may travel past the flow control mechanism along an approximately straight path. The substance may travel from the inlet and/or supply to the outlet along a curved and/or angled path. A flow control mechanism for a straight-path valve may have a different design than a flow control mechanism for a curved and/or angled-path valve.

Various right-angle valves for controlling the flow of gasses have flow control mechanisms that are twistable. Adjusting the valve between fully open and fully closed may involve twisting the flow control mechanism several full turns. In implementations where the valve is regularly adjusted, the numerous rotations may wear on the components of the valve, causing a relatively short service life for the valve. The numerous rotations may also be burdensome and/or tiring for an individual that manually adjusts the valve. Furthermore, the manufacturing process for a right-angle valve may include several steps. With each step, the risk of a defect being introduced into the valve increases. The manufacturing process for a right-angle valve may be limited in productivity, and therefore profitability, by the amount of time it takes to complete all the steps.

Implementations of various valve cartridges described herein may address some or all of the problems described above. A valve cartridge may include an outer cylindrical body and an inner cylindrical body disposed in a channel formed by the outer cylindrical body. The outer cylindrical body may include a wall that defines the channel. The channel may extend longitudinally through the outer cylindrical body. The outer cylindrical body may include a ramped slot. The ramped slot may extend radially from an inner surface of the wall towards an outer surface of the wall. The ramped slot may extend angularly from a first angular position on the wall to a second angular position. The ramped slot may extend longitudinally from a first longitudinal position on the wall to a second longitudinal position. The inner cylindrical body may include a handle interface approximate to a first end of the inner cylindrical body. The inner cylindrical body may include a pin extending radially from the inner cylindrical body and into the ramped slot. The inner cylindrical body may include a valve seat at a second end of the inner cylindrical body.

Valves incorporating at least one of the valve cartridges described herein may require less work to open and close compared to a valve with a conventional flow control mechanism. Rotation of the inner cylindrical body in a range from 60 to 120 degrees translates to longitudinal travel of the inner cylindrical body. The longitudinal travel may be sufficient to fully open and/or fully close a valve in which the valve cartridge is incorporated as a flow control mechanism. Additionally, valves manufactured with at least one of the valve cartridges described herein may require fewer manufacturing steps, which may increase productivity and reduce the risk of defects in the valves. Finally, valves installed in a flow system may be retrofit with at least one of the valve cartridges described herein. This may decrease the cost of servicing existing, installed valves.

Various features may be referred to using cylindrical coordinates such as a longitudinal axis, a radial axis, and an angular position. The longitudinal axis may be an imaginary line that defines points along a length of a cylindrical shape. The radial axis may be an imaginary line that defines points along a width of the cylindrical shape from the longitudinal axis. The angular position may be a point along an imaginary circumference around the longitudinal axis. The imaginary circumference may define a plane that is approximately perpendicular to the longitudinal axis. A direction of change of the angular position may be perpendicular to the radial axis. The radial axis may be perpendicular to the longitudinal axis.

FIG. 1 illustrates a perspective view of a valve 100 including a valve cartridge 102, according to an embodiment. The valve 100 may be easier to open and close, involving less rotation to completely open and/or completely close the valve than conventional valves. The valve 100 may involve fewer manufacturing steps than conventional valves due to the incorporation of the valve cartridge 102.

The valve 100 may include the valve cartridge 102 and a valve body 104. The valve body may include an inlet 106, an outlet 108, a supply 110, and/or a flow control opening 112. The valve cartridge 102 may be inserted into the flow control opening 112 and/or attached to the valve body 104. The inlet 106 may be configured to mate with a flow line (e.g., a pipe or tube) that directs a substance into the valve 100. For example, the inlet 106 may include female-end threading for coupling to male-end threading of a pipe, pipe connector, or adapter. The adapter may, for example, enable coupling of the valve 100 to a flow line with a different coupling mechanism than the inlet 106. The outlet 108 may be similarly configured to mate with a flow line that directs a substance away from the valve 100. The supply 110 may be configured to mate with a container that holds the substance. The flow control opening 112 may be configured to mate with the valve cartridge 102.

The valve body 104 and/or the valve cartridge 102 may be formed of a material suited for a use of the valve 100. For example, the valve 100 may be used to regulate flow of a gas. The valve 100 may be used to regulate flow of a liquid. The valve 100 may be used to regulate flow of oil. The valve 100 may be used to regulate flow of a gel. The valve 100 may be used to regulate flow of a non-newtonian fluid. The valve body 104 and/or the valve cartridge 102 may be formed of a metal such as brass, iron, steel, titanium, and so forth. The valve body 104 and/or the valve cartridge 102 may be formed of a polymer such as nylon, polycarbonate, polyvinyl chloride (PVC), acrylonitrile butadiene styrene (ABS), polyethylene, and so forth.

The valve 100 may be a right-angle valve. For example, an axis of the inlet 106 and/or the outlet 108 may be perpendicular or approximately perpendicular to an axis of the supply 110. The axis of the inlet 106 and/or the outlet 108 may be perpendicular or approximately perpendicular to an axis of the flow control opening 112. The valve 100 may be a straight valve. For example, the axis of the outlet 108 may be parallel or approximately parallel to the axis of the supply 110. The axis of the inlet 106, the outlet 108, and/or the supply 110 may be parallel or approximately parallel to the axis of the flow control opening. The valve 100 may be an angled valve.

Figure 2:
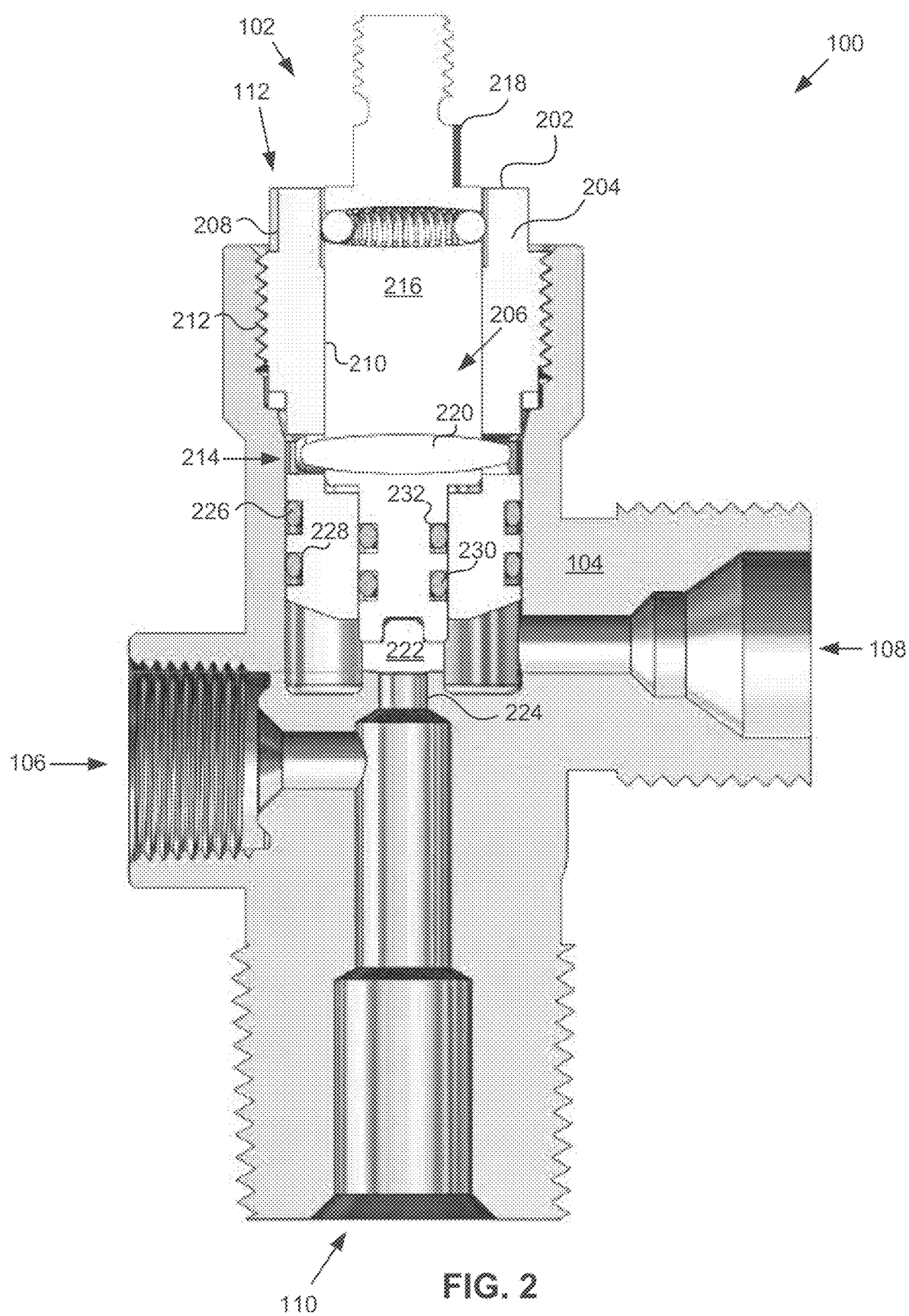
FIG. 2 illustrates a cross-sectional view of the valve body and the valve cartridge, according to an embodiment.

FIG. 2 illustrates a cross-sectional view of the valve body 104 and the valve cartridge 102, according to an embodiment. The valve cartridge 102 enables the valve 100 to be opened and/or closed with less than a full turn applied to the valve cartridge 102. Additionally, the valve cartridge 102 may be easily combined with the valve body 104 by placing the valve cartridge 102 in the flow control opening 112. This may eliminate various steps in manufacturing the valve 100 compared with conventional manufacturing processes.

The valve cartridge 102 may include an outer cylindrical body 202. The outer cylindrical body 202 may include a wall 204 that defines a channel 206 extending longitudinally through the outer cylindrical body 202. The wall 204 may define an outer surface 208 of the outer cylindrical body 202. The wall 204 may define an inner surface 210 of the outer cylindrical body 202. The inner surface may define the channel 206.

At least a portion of the outer surface 208 of the outer cylindrical body 202 may form a mating surface 212. The mating surface 212 may be approximate and/or adjacent to a first end of the outer cylindrical body. The first end of outer cylindrical body 202 may be adjacent to and/or extend from the flow control opening 112. The mating surface 212 may be configured to secure the valve cartridge 102 to the valve body 104. The mating surface 212 may, for example, be threading. The threading may be male-end threading. The threading may tighten the outer cylindrical body 202 into the flow control opening 112 by rotating the outer cylindrical body 202 in a same direction that causes the valve cartridge 102 to close the valve 100. The threading may tighten the outer cylindrical body 202 into the flow control opening 112 by rotating the outer cylindrical body 202 in a same direction that causes the valve cartridge 102 to open the valve 100. The mating surface 212 may include a quick-lock mechanism. The mating surface 212 may include a hook and/or catch.

The outer cylindrical body 202 may include a ramped slot 214 in the wall 204. The ramped slot 214 may extend radially from the inner surface 210 towards the outer surface 208 of the wall 204. The ramped slot 214 may be positioned between the mating surface 212 and a second end of the outer cylindrical body 202. The ramped slot 214 may be positioned between the mating surface 212 and another feature at and/or approximate to the second end of the outer cylindrical body 202. The ramped slot 214 may extend partially from the inner surface 210 towards the outer surface 208. The ramped slot may not be visible on the outer surface 208. The ramped slot 214 may extend through the wall 204 from the inner surface 210 to the outer surface 208. In various implementations, the outer cylindrical body 202 may include two or more ramped slots 214. For example, the outer cylindrical body 202 may include two ramped slots 214 on opposite sides of the outer cylindrical body 202 from each other.

The valve cartridge 102 may include an inner cylindrical body 216. The inner cylindrical body 216 may be disposed in the channel 206. The inner cylindrical body 216 may be rotatable in the channel 206. The inner cylindrical body 216 may form a fluid-tight seal with the outer cylindrical body 202. A lubricant may be disposed between the inner cylindrical body 216 and the outer cylindrical body 202.

The inner cylindrical body 216 may include a handle interface 218. The handle interface 218 may be at or approximate to a first end of the inner cylindrical body 216. The handle interface 218 may extend away from the valve body 104. The first end of the inner cylindrical body 216 may be at a same side of the valve cartridge 102 as the first end of the outer cylindrical body 202. Additionally or alternatively, the inner cylindrical body 216 may include a rotator interface. The rotator interface may enable manual and/or automatic rotation of the inner cylindrical body. For example, the rotator interface may couple to the rotor of a servomotor. The servomotor may be electronically activated to open and/or close the valve. In another implementation, the inner cylindrical body 216 may include a tool interface.

A tool may be mated with (e.g., inserted into) the tool interface to manually rotate the inner cylindrical body 216.

The inner cylindrical body 216 may include a pin 220. The pin 220 may extend radially from the inner cylindrical body 216 and into the ramped slot 214. In various implementations, such as those including two ramped slots, the pin 220 may extend through the inner cylindrical body 216 and into the ramped slots 214 on both sides of the outer cylindrical body 202.

The inner cylindrical body 216 may include a valve seat 222. The valve seat 222 may be configured to press against an internal supply opening 224 that extends from the supply 110 and/or the inlet 106 of the valve body 104. When the valve seat 222 presses against the internal supply opening 224, the valve may be closed, preventing flow to the outlet 108. When the valve seat 222 is raised away from the internal supply opening 224, flow may be enabled from the inlet 106 and/or the supply 110 to the outlet 108.

The valve seat 222 may be disposed at a second end of the inner cylindrical body 216. The second end of the inner cylindrical body 216 may be opposite the first end. The valve seat 222 may be attached to the inner cylindrical body 216 such that the valve seat 222 is rotatable relative to the inner cylindrical body 216. For example, the valve seat 222 may include a pad and a stem. The stem may include a hook that engages with a catch inside the inner cylindrical body 216. The hook and catch may prevent the valve seat 222 from becoming detached from the inner cylindrical body 216. The valve seat 222 may be formed of a compressible polymer that is more compressible than a material that forms the inner cylindrical body 216. The valve seat 222 may be formed of a material that is wear-resistant. For example, the valve seat 222 may be formed of polytetrafluoroethylene (PTFE). The valve seat 222 may be formed of a rubber material.

The valve cartridge 102 may include a first sealing ring 226 around the outer cylindrical body 202. The first sealing ring 226 may, for example, be an O-ring. The first sealing ring 226 may create a liquid- and/or air-tight seal between the outer cylindrical body 202 and a valve body 104. The outer cylindrical body 202 may include a first groove 228 in the wall 204 on the outer surface 208. The first groove 228 may be approximate to the second end of the outer cylindrical body 202. The first sealing ring 226 may be seated in the first groove 228.

The valve cartridge 102 may include a second sealing ring 230, such as an O-ring, between the outer cylindrical body 202 and the inner cylindrical body 216. The second sealing ring 230 may create a liquid- and/or air-tight seal between the inner cylindrical body 216 and the outer cylindrical body 202. The inner cylindrical body 216 may include a second groove 232 in an outer surface of the inner cylindrical body 216. The second groove 232 may be approximate to the second end of the inner cylindrical body 216. The second sealing ring 230 may be seated in the second groove 232.

Figure 3A:
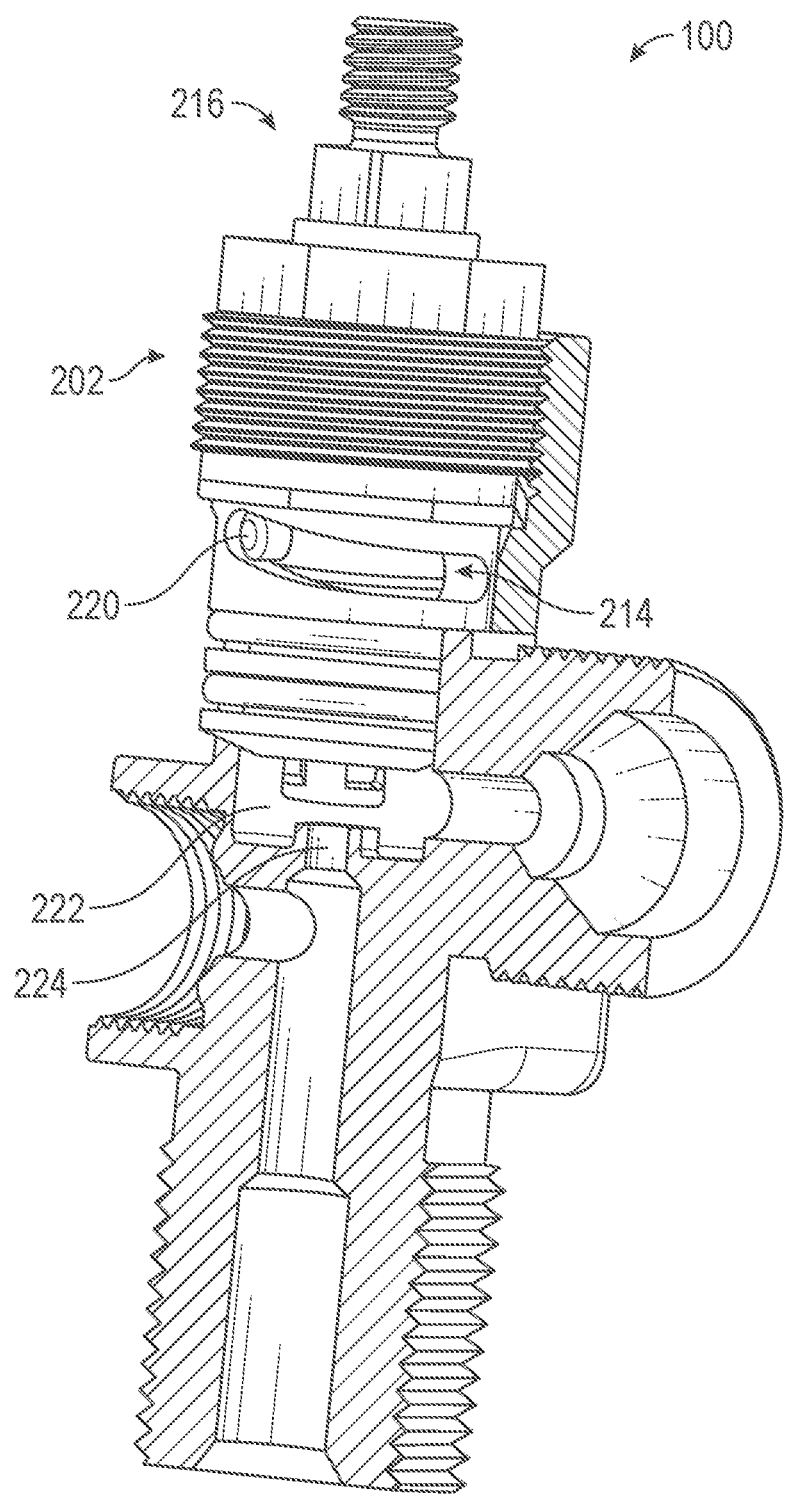
FIG. 3A illustrates a partial cross-sectional view of the valve body showing the valve cartridge 102 in an open position, according to an embodiment.
Figure 3B:
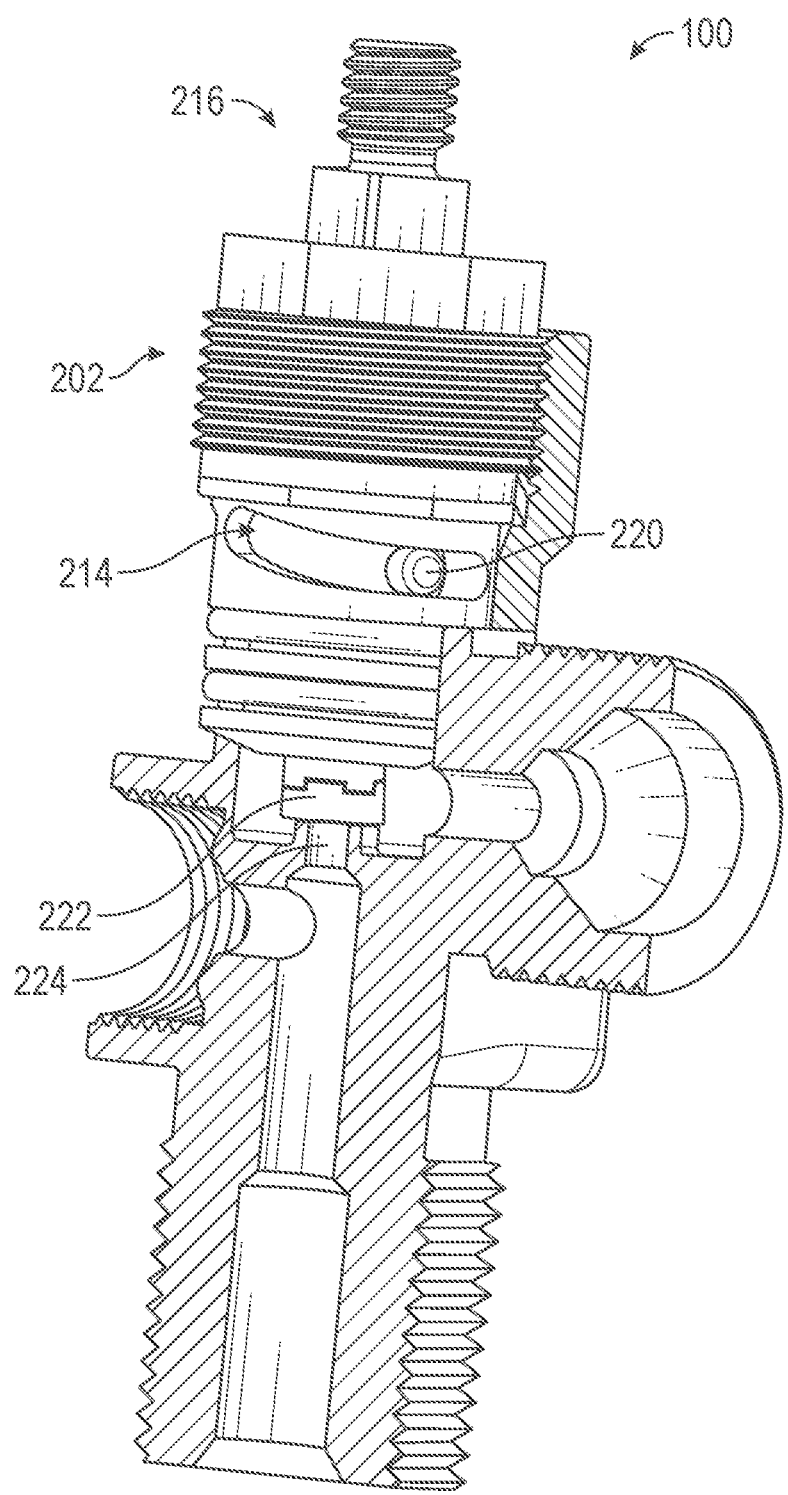
FIG. 3B illustrates a partial cross-sectional view of the valve body showing the valve cartridge in a closed position, according to an embodiment.

FIG. 3A illustrates a partial cross-sectional view of the valve body 104 showing the valve cartridge 102 in an open position, according to an embodiment. FIG. 3B illustrates a partial cross-sectional view of the valve body 104 showing the valve cartridge 102 in a closed position, according to an embodiment. The ramped slot 214 may be shaped so that a quarter to half a turn of the inner cylindrical body 216 closes or opens the valve 100. This may require less effort than conventional valves and/or may enable a user to more quickly open and close the valve 100.

The ramped slot 214 may extend angularly from a first angular position on the wall 204 to a second angular position. For example, the ramped slot 214 may extend from zero degrees to sixty degrees, zero degrees to ninety degrees, zero degrees to 120 degrees, and so forth. The ramped slot 214 may extend longitudinally from a first longitudinal position on the wall 204 to a second longitudinal position. For example, the ramped slot 214 may start at a longitudinal coordinate of zero and extend to a longitudinal coordinate in a range from 0.04 inches to 0.1 inches, in a range from 0.05 inches to 0.07 inches, or approximately 0.055 inches. Conceptually, this translates to the ramped slot 214 appearing to rise on the wall 204 as it extends around the outer cylindrical body 202.

In one implementation, the valve cartridge 102 may be in a fully open arrangement at approximately zero degrees. At approximately sixty degrees, the valve seat 222 may initiate contact with a portion of the valve body 102 around the internal supply opening 224. At approximately ninety degrees, the valve cartridge 102 may be in a fully closed arrangement, where the valve seat 222 is fully engaged with the portion of the valve body 102 around the internal supply opening 224. The ramped slot 214 may be long enough to allow for rotation of the inner cylindrical body 216 up to approximately 120 degrees. The valve seat 222 may be made of a material that wears over time with use. The wear may cause the valve seat 222 to become thinner. The extra rotation may enable the valve seat 222 to seal the internal supply opening 224, even as the valve seat 222 wears down and becomes thinner.

A pitch of the ramped slot 214 relative to the radial plane of the valve cartridge 102 may vary along a length of the ramped slot 214. The pitch may vary continuously or by segments. The ramped slot 214 may include a first segment and a second segment. The first segment may be longitudinally ramped (i.e., rises or falls in longitude) and a second segment may be longitudinally flat (i.e., maintains the same longitudinal position for a set of angular positions). The first segment may have a first longitudinal slope (i.e., pitch) and the second segment may have a second longitudinal slope. The first longitudinal slope may be steeper than the second longitudinal slope. The first segment may correspond to an open position of the valve 100, and the second segment may correspond to a closed position of the valve 100. The first longitudinal slope and the second longitudinal slope may be in the same direction. The first longitudinal slope and the second longitudinal slope may be in opposite directions. For example, the first segment and the second segment may form a v-shape. The first segment may be longer, i.e., may have a wider angular arc, than the second segment.

The pin 220 that passes into and/or through the inner cylindrical body 216 also extends into the ramped slot 214. Accordingly, rotation of inner cylindrical body 216 may translate into longitudinal movement of inner cylindrical body 216 by the pin 220 traveling in the ramped slot 214 as the inner cylindrical body 216 is rotated. As the inner cylindrical body 216 is rotated, such as manually by a handle attached to the handle interface 218, the ramped slot 214 exerts a force on the pin 220 that causes translational motion of the inner cylindrical body 216 along the longitudinal axis. As the ramped slot 214 guides the pin 220 towards the second end of the outer cylindrical body 202, the valve seat 222 may engage with the internal supply opening 224. As the ramped slot 214 guides the pin 220 towards the first end of the outer cylindrical body 202, the valve seat 222 may disengage from the internal supply opening 224.

Figure 4:
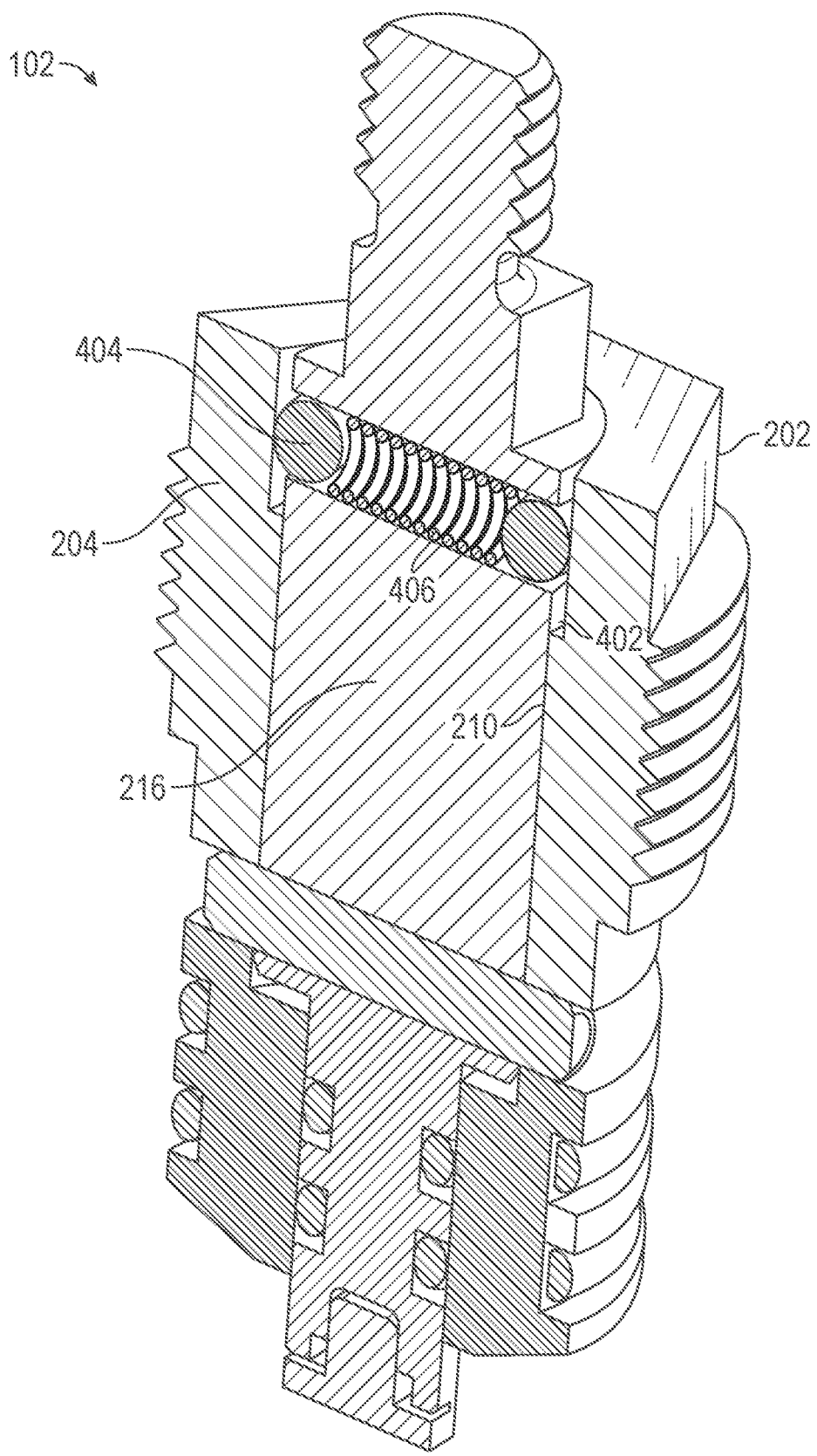
FIG. 4 illustrates a cross-sectional view of the valve cartridge, according to an embodiment.

FIG. 4 illustrates a cross-sectional view of the valve cartridge 102, according to an embodiment. The valve 100 may be manufactured, in part, by inserting the valve cartridge 102 into the flow control opening 112. This simple assembly may obviate various assembly steps used for conventional valves, decreasing manufacturing cost and/or increasing manufacturing speed.

The outer cylindrical body 202 may include a detent 402 in the inner surface 210 of the wall 204. The detent 402 may be a dip and/or a notch in the inner surface 210. The inner cylindrical body 216 may include a protrusion 404 that extends from an outer surface of the inner cylindrical body 216. The protrusion 404 may be configured in size and/or shape to fit in the detent 402. Similarly, the detent 402 may be configured in size and/or shape to receive the protrusion 404. The detent 402 and the protrusion 404 may be approximate to the first ends, respectively, of the outer cylindrical body 202 and the inner cylindrical body 216.

The protrusion 404 may be a bump on the outer surface of the inner cylindrical body 216. The protrusion 404 may be a ball. The ball may freely rotate in the inner cylindrical body 216. A compressed spring 406 may be disposed within the inner cylindrical body 216. The spring 406 may be adjacent to the ball. The spring 406 may press radially outwards against the ball. The spring 406 may exert a counter force against an inside surface of the inner cylindrical body 216. The spring 406 may exert a counter force against a second ball opposite the first ball.

The detent 402 and the protrusion may, as the inner cylindrical body 216 is rotated within the outer cylindrical body 202, generate haptic feedback indicative of an arrangement of the valve cartridge 102. The arrangement may be an open arrangement of the valve cartridge 102. The arrangement may be a closed arrangement of the valve cartridge 102. The arrangement may be a fully open and/or a fully closed arrangement of the valve cartridge 102. The arrangement may be a partially open and/or partially closed arrangement of the valve cartridge 102.

FIG. 5A illustrates a top cross-sectional view of the valve cartridge 102 in a fully open position, according to an embodiment. FIG. 5B illustrates a top cross-sectional view of the valve cartridge 102 in a partially-closed position, according to an embodiment. FIG. 5C illustrates a top cross-sectional view of the valve cartridge 102 in a fully-closed position, according to an embodiment. The protrusion 404 and the detent 402 may provide tactile feedback to a user that indicates when the valve 100 is open and when the valve 100 is closed. This may prevent over-rotation of the inner cylindrical body 216, which may cause damage and wear to the valve 100.

The outer cylindrical body 202 may include two or more detents 402 in the inner surface 210. A first detent 502 may be at a first longitudinal and/or angular position on the inner surface 210. A second detent 504 may be at a second longitudinal and/or angular position on the inner surface 210. The second longitudinal position may be different from the first longitudinal position. The second angular position may be different from the first angular position. The difference in the longitudinal and/or angular positions may correlate to the open and closed positions of the inner cylindrical body 216. The first detent 502 and/or the second detent 504 may have a longitudinal length approximately the same as the amount of travel of the inner cylindrical body 216 between the open and closed positions. Accordingly, the first detent 502 and the second detent 504 may have the same longitudinal positions.

In an open position, the protrusion 404 may be longitudinally and/or angularly aligned with the first detent 502. In a closed position, the protrusion 404 may be longitudinally and/or angularly aligned with the second detent 504. At a first angular position of the inner cylindrical body 216, the protrusion 404 may be longitudinally aligned with the first detent 502. At a second angular position of the inner cylindrical body 216, the protrusion may be longitudinally aligned with the second detent. The angular spacing of the first detent 502 and the second detent 504 may be less than the angular extent of the ramped slot 214. When closing the valve 100, rotating past the second detent 504 may further press the valve seat 222 against the internal supply opening 224.

The valve seat 222 may screw into or otherwise attach to the inner cylindrical body 216. To prevent the valve seat 222 from rotating and/or unscrewing from the inner cylindrical body 216, the valve seat 222 may include an anti-rotation feature 506. The anti-rotation feature 506 may prevent the valve seat 222 from rotating independently from the inner cylindrical body 216. For example, the valve seat 222 and the inner cylindrical body 216 may include alternating teeth that engage with each other to prevent the valve seat 222 from rotating.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements, and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A valve cartridge, comprising:
an outer cylindrical body, comprising:
a wall that defines:
an outer surface of the outer cylindrical body; and
an inner surface of the outer cylindrical body, the inner surface defining a longitudinal channel through the outer cylindrical body;
threading formed by the outer surface of the wall, the threading approximate to a first end of the outer cylindrical body;
a first groove in the wall on the outer surface, the first groove approximate to a second end of the outer cylindrical body opposite the first end of the outer cylindrical body;
a first sealing ring seated in the first groove;
a first detent on the inner surface of the outer cylindrical body; and
a first ramped slot in the wall positioned between the threading and the first groove, wherein the first ramped slot extends:
through the wall from the inner surface of the outer cylindrical body to the outer surface of the outer cylindrical body;
angularly along the wall from a first angular position to a second angular position; and
longitudinally along the wall from a first longitudinal position to a second longitudinal position; and
an inner cylindrical body disposed in the channel and rotatable in the channel, the inner cylindrical body comprising:
a handle interface approximate to a first end of the inner cylindrical body, wherein the first end of the inner cylindrical body is at a same side of the valve cartridge as the first end of the outer cylindrical body;
a second groove in an outer surface of the inner cylindrical body, the second groove approximate to a second end of the inner cylindrical body opposite the first end of the inner cylindrical body;

a second sealing ring seated in the second groove;
a ball protruding from the outer surface of the inner cylindrical body approximate to the first end of the inner cylindrical body, wherein:
  at a first angular position of the inner cylindrical body, the ball is longitudinally aligned with the first detent on the inner surface of the outer cylindrical body; and
  the ball and the first detent are configured to generate haptic feedback that signals an open or a closed arrangement of the valve cartridge;
a pin extending radially from the inner cylindrical body and into the ramped slot; and
a member at the second end of the inner cylindrical body.

2. The valve cartridge of claim 1, further comprising a compressed spring inside the inner cylindrical body adjacent to the ball, wherein the spring presses radially outwards on the ball.

3. The valve cartridge of claim 1, further comprising a second ramped slot on an opposite side of the outer cylindrical body from the first ramped slot.

4. The valve cartridge of claim 3, wherein the pin extends through the inner cylindrical body and radially from the inner cylindrical body into the first ramped slot and the second ramped slot.

5. The valve cartridge of claim 1, the member coupled to the inner cylindrical body and rotatable relative to the inner cylindrical body.

6. The valve cartridge of claim 1, wherein rotation of inner cylindrical body translates into longitudinal movement of the inner cylindrical body by the pin traveling in the ramped slot as the inner cylindrical body is rotated.

7. The valve cartridge of claim 1, the outer cylindrical body further comprising a second detent on the inner surface of the outer cylindrical body, wherein:
  the second detent has a different angular and longitudinal position on the inner surface than the first detent; and
  in a second angular position of the inner cylindrical body, the ball is longitudinally aligned with the second detent.

8. The valve cartridge of claim 1, wherein the ramped slot comprises a first segment that is longitudinally ramped and a second segment that is longitudinally flat.

9. The valve cartridge of claim 1, wherein:
  the ramped slot comprises a first segment and a second segment that are longitudinally ramped;
  the first segment is longer than the second segment; and
  the first segment and the second segment form a v-shape.

10. The valve cartridge of claim 1, wherein a longitudinal length and an angular length of the ramped slot are configured such that rotation of the inner cylindrical body in a range from 60 to 120 degrees translates to longitudinal travel of the inner cylindrical body in a range from 0.05 inches to 0.07 inches.

11. A valve cartridge, comprising:
an outer cylindrical body, comprising:
  a wall that defines a channel extending longitudinally through the outer cylindrical body;
  an outer surface of the wall forming a mating surface configured to secure the valve cartridge with a valve body;
  a detent in an inner surface of the wall adjacent to the channel; and
  a ramped slot in the wall of the outer cylindrical body, wherein the ramped slot extends:
    radially from the inner surface of the wall towards the outer surface of the wall;
    angularly on the outer cylindrical body from a first angular position to a second angular position; and
    longitudinally on the outer cylindrical body from a first longitudinal position to a second longitudinal position; and
an inner cylindrical body disposed in the channel and rotatable in the channel, the inner cylindrical body comprising:
  a handle interface approximate to a first end of the inner cylindrical body;
  a protrusion that extends from the outer surface of the inner cylindrical body, wherein the protrusion is:
    longitudinally aligned with the detent in the inner surface of the outer cylindrical body; and
    configured to fit in the detent;
  a pin extending radially from the inner cylindrical body and into the ramped slot; and
  a member at a second end of the inner cylindrical body.

12. The valve cartridge of claim 11, further comprising a lubricant between the inner cylindrical body and the outer cylindrical body.

13. The valve cartridge of claim 11, further comprising:
a first O-ring around the outer cylindrical body that creates a first liquid-tight seal between the outer cylindrical body and a valve body; and
a second O-ring between the outer cylindrical body and the inner cylindrical body that creates a second liquid-tight seal between the inner cylindrical body and the outer cylindrical body.

14. The valve cartridge of claim 11, wherein the protrusion comprises:
a ball that freely rotates in the inner cylindrical body; or
a bump on an outer surface of the inner cylindrical body.

15. The valve cartridge of claim 11, wherein the member is formed of a compressible polymer that is more compressible than a material that forms the inner cylindrical body.

16. The valve cartridge of claim 11, wherein the mating surface comprises threading that tightens into a valve body in a same direction as a rotation of the inner cylindrical body to engage the member with a supply opening of the valve body.

17. An apparatus, comprising:
an outer cylindrical body, comprising:
  a wall that defines a channel extending longitudinally through the outer cylindrical body;
  a detent in an inner surface of the wall adjacent to the channel; and
  a ramped slot that extends:
    radially from an inner surface of the wall towards an outer surface of the wall;
    angularly from a first angular position on the wall to a second angular position; and
    longitudinally from a first longitudinal position on the wall to a second longitudinal position; and
an inner cylindrical body disposed in the channel, the inner cylindrical body comprising:
  a handle interface approximate to a first end of the inner cylindrical body;
  a protrusion that extends from the outer surface of the inner cylindrical body, wherein the protrusion is:
    longitudinally aligned with the detent in the inner surface of the outer cylindrical body; and
    configured to fit in the detent;
  a pin extending radially from the inner cylindrical body and into the ramped slot; and a member at a second end of the inner cylindrical body, wherein a longitudinal length or an angular length of the ramped slot is adaptable to enable the apparatus to be used in:
  a first valve body having a first longitudinal depth; or
  a second valve body having a second longitudinal depth that is different from the first longitudinal depth.

18. The apparatus of claim 17, wherein the ramped slot extends partially from the inner surface of the wall towards the outer surface of the wall and is not visible on the outer surface of the wall.

19. The apparatus of claim 17, wherein the member is attached to the inner cylindrical body and rotatable relative to the inner cylindrical body.

20. The apparatus of claim 17, the member further comprising an anti-rotation feature that prevents the member from rotating independently from the inner cylindrical body.

* * * * *